US006094826A

United States Patent [19]

Schmidt

[11] Patent Number: 6,094,826

[45] Date of Patent: Aug. 1, 2000

[54] RECIPROCATING SLOT CUTTING TOOL

[75] Inventor: James J. Schmidt, Mahomet, Ill.

[73] Assignee: Hobbico, Inc., Champaign, Ill.

[21] Appl. No.: 09/144,777

[22] Filed: Sep. 1, 1998

[51] Int. Cl.[7] .......... B23D 49/10

[52] U.S. Cl. .......... 30/369; 30/277.4; 30/392; 144/136.95

[58] Field of Search .......... 30/369, 277.8, 30/503, 503.5, 392; 144/136.95, 154.5; 83/848, 849, 853

[56] References Cited

U.S. PATENT DOCUMENTS

| | | | |
|---|---|---|---|
| 1,898,956 | 2/1933 | Harvie . | |
| 2,534,001 | 12/1950 | Couse | 144/136.95 X |
| 2,764,188 | 9/1956 | Hoffman | 143/60 |
| 3,016,932 | 1/1962 | Jacobson | 143/68 |
| 3,044,171 | 7/1962 | Cecere | 30/166 |
| 4,665,617 | 5/1987 | Maier et al. | 30/374 |
| 4,693,009 | 9/1987 | Bone | 30/392 |
| 4,771,542 | 9/1988 | Beveridge | 30/392 |
| 4,798,001 | 1/1989 | Grossmann et al. | 30/355 |
| 5,031,324 | 7/1991 | Berghauser et al. | 30/369 |
| 5,099,705 | 3/1992 | Dravnieks | 74/50 |
| 5,199,174 | 4/1993 | Wild | 30/123.3 |
| 5,212,887 | 5/1993 | Farmerie | 30/393 |
| 5,349,754 | 9/1994 | Wuensch et al. | 30/369 |
| 5,456,011 | 10/1995 | Inkster | 30/503.5 X |
| 5,479,709 | 1/1996 | Lai | 30/123.3 |
| 5,561,909 | 10/1996 | Berg et al. | 30/392 |
| 5,566,768 | 10/1996 | Bourke | 173/29 |
| 5,634,277 | 6/1997 | Wada et al. | 30/392 |
| 5,797,189 | 8/1998 | Gilbert | 30/503.5 X |

FOREIGN PATENT DOCUMENTS

| | | | |
|---|---|---|---|
| 0 267 311 | 5/1988 | Germany | B23D 49/00 |

*Primary Examiner*—Douglas D. Watts
*Attorney, Agent, or Firm*—Gardner, Carton & Douglas

[57] ABSTRACT

This invention is a tool for plunge cutting comprising a motor, a transmission connected to the motor and a blade assembly connected to the transmission, wherein the blades move in an oppositely reciprocating and sliding manner to provide plunge cuts of variable depth with closed ends and a continuous perimeter. The tool of the invention may be held and operated with one hand. The invention is designed to be held in juxtaposition to the area to be cut, and the invention further optionally includes a novel blade wherein the blades have opposite first and second sides, wherein the first side is completely flat, allowing it to slide unobstructed against the first side of the other blade; and wherein alternating teeth, including both end teeth, are straight and not bent or set; and wherein alternating even teeth are bent toward the second side of the blade; and wherein one-half of the teeth point forward and the other half of the teeth point aft; and wherein the blade teeth follow an arc; and wherein the front and aft edges of the blade are shaped to form a gullet.

19 Claims, 2 Drawing Sheets

RECIPROCATING SLOT CUTTING TOOL

BACKGROUND OF THE INVENTION

1. Field of the Invention

The present invention relates to a motorized slotting device with oppositely reciprocating blades. The device is held so that the blades are in juxtaposition to the area to be cut, and thus may make plunge cuts with closed ends in materials such as but not limited to wood.

2. Scope of the Prior Art

As part of building a model such as an airplane model, a modeler must attach certain moving parts such as but not limited to a rudder, elevator and aileron to the frame of the model using hinges. To attach a hinge to the frame, the modeler generally makes several small slots or pockets in the frame of the model and in the parts to be joined by hinges.

Traditionally, the modelers use a knife or other unpowered slotting tool to manually cut the appropriate size slots or pockets to receive the hinges. The process of manually cutting such slots is difficult and tedious. Because it is necessary to apply significant force to make the knife or other tool penetrate the material, it presents a significant risk of breaking the model frame, particularly if the frame is constructed of thin pieces of delicate, soft wood such as balsa wood. In addition, slots cut with a knife are often poorly aligned and the wrong size to fit the hinge. Thus, the use of conventional methods of cutting slots in models poses several problems for a modeler, namely, risk of breaking the model frame, physical difficulty in manipulating the knife or tool through the wood, and inappropriately aligned and sized slots and pockets.

Saws and knives with oppositely reciprocating blade action are disclosed in the prior art. However these saws and knives are what is generally known in the industry as "cut-offs," i.e., saws which are used for cutting off a section of a board or pipe. These saws or knives generally cut a piece of material off from the main body of the material, or require that a channel be cut from an edge of the material to the position where the slot or pocket is desired. In addition, these saws or knives are generally too large for use by a modeler, and the action of such tools is generally too coarse and aggressive for use in making models.

In contrast, the present invention is designed for making "plunge" cuts, in which the blades are held in juxtaposition to and directly over the area to be cut, and the slot or pocket is carved out of the material by using blades that penetrate directly into any surface of the material, creating a slot having a variable depth. Such cuts have a continuous perimeter, and need not penetrate the material completely if a pocket instead of a slot is required.

Thus, there is a need for a motorized tool for cutting slots or pockets for instance in models, which may be manipulated and supported by a single hand, and which is capable of making plunge cuts of various depths. Other objects and advantages of the present invention will become obvious to the reader and it is intended that these objects and advantages are within the scope of the present invention.

SUMMARY OF THE INVENTION

It is an object of the invention to provide a motorized tool for cutting slots or pockets in material, whereby the slots or pockets have closed ends and a continuous perimeter where no open-ended channels are made in the material as a result of the cuts.

It is a further object of the invention to provide a motorized tool for cutting slots or pockets in a manner that is easier than present manual methods.

It is a further object of the invention to provide a motorized tool for cutting slots or pockets using oppositely reciprocating blades, each of which compensate for the lengthwise forces imparted by the other, and thus requiring little effort on the part of the user to hold the tool in juxtaposition to the desired location of the slot.

It is a further object of the invention to provide a motorized saw with oppositely reciprocating blade action for making plunge cuts.

It is a further object of the invention to provide a motorized tool for cutting slots or pockets wherein the tool blades include a gullet which allows the blades to cut deep into the material, unobstructed by particulate matter.

It is a further object of the invention to provide a motorized tool for making small cuts in delicate material, whereby the risk of breakage of the material is minimized.

The invention is a tool for plunge cutting comprising a motor, a drive transmission connected to the motor and a blade assembly connected to the transmission, wherein the blades have teeth and move in an oppositely reciprocating and sliding manner to provide plunge cuts with closed ends and a continuous perimeter, and wherein the blades optionally may be sized and the teeth may optionally be set to make cuts appropriate for a model hinge. As used herein, "plunge cutting" means that the tool is held in juxtaposition to the area to be cut and the blades are "plunged" into the material during cutting. The tool of the invention may be held and operated with one hand.

The invention further includes a novel blade, wherein a plurality of alternating teeth are bent to one side, and the ends of the blade have a gullet area. Optionally, the paints of the teeth may follow a curve.

DETAILED DESCRIPTION OF THE PREFERRED EMBODIMENTS

Figure 1:
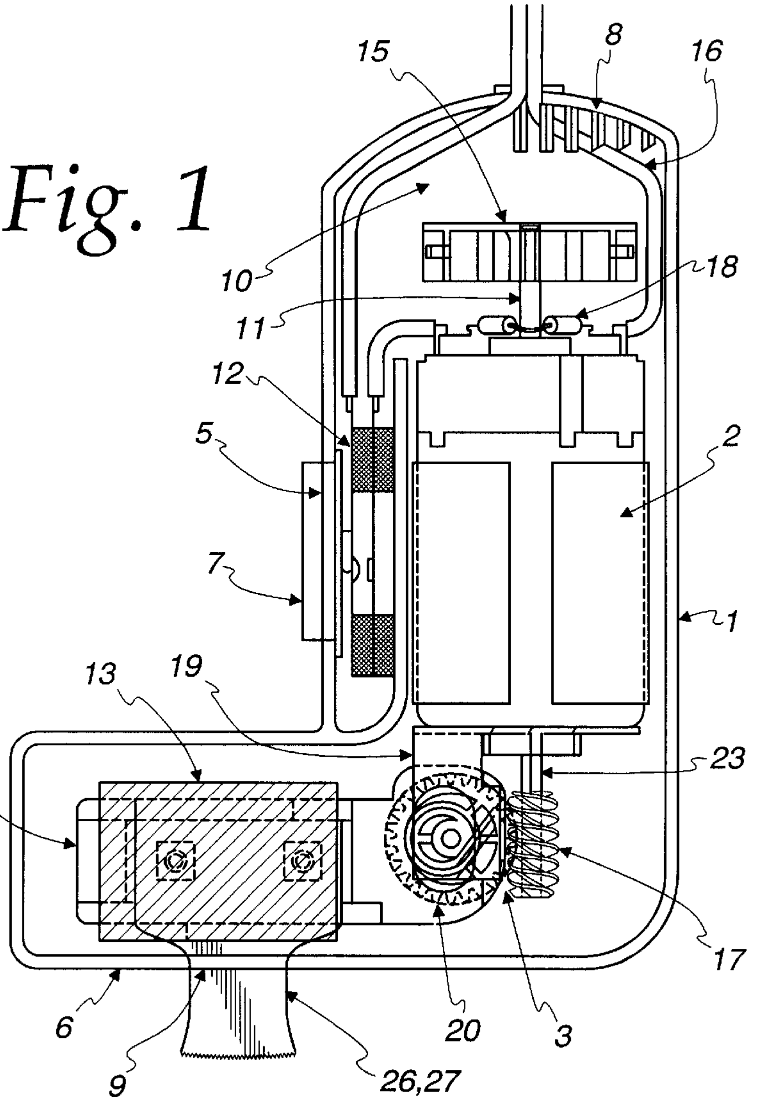
FIG. 1 is a cut-away drawing of the slotting tool which reveals the internal components of the tool.

FIGS. 1 through 7 illustrate a preferred embodiment of the motorized slotter tool made in accordance with the principles of the invention. The tool includes a housing 1, a motor 2, a gear transmission 3 and a blade assembly 4, as shown on FIGS. 1, 3 and 4.

In a preferred embodiment, the housing 1 includes a switch opening 5 and a blade access hatch 6 as shown in FIG. 1. The switch opening 5 provides an opening in which an on-off switch 7 may be mounted. The blade access hatch 6 is removable to permit servicing and replacement of the blades 26 and 27 by the user without the need to open the entire housing. The blade access hatch 6 provides a small slot 9 through which the blades 26 and 27 protrude outside the housing, such that the blades 26 and 27 may be visually aligned with the area to be cut.

The housing, which may be constructed of ABS plastic or any material suitable to withstand the temperature of the motor and vibration and stresses of the tool, further defines a chamber 10, into which is mounted a motor 2 such as an electric motor as illustrated here, the motor having a driveshaft 11 which protrudes from both ends of the motor, the internal components 12 of the on-off switch 7, a geared transmission 3 having a worm gear 17 and a cam gear 20, a blade holder guide 13, two blade holders 14, a fan 15 and the internal wiring and electronics 16, as shown in FIG. 1.

The motor 2 and fan 15 may be any type of commercially available motor and fan suited for use with an oppositely reciprocating slotter tool, provided that it has a driveshaft which protrudes from both ends of the motor, to accommodate the worm gear 17 and the fan 15. Power to the motor 2 is controlled by the switch 7. One suitable switch is a spring loaded push-button switch as shown in FIG. 1, although other types of suitable switch mechanisms will be apparent to those skilled in the art. The fan 15 draws air in through louvers 8 in the housing 1 and passes the air out through the slot 9 in blade access hatch 6. This design prevents dust from entering the housing.

The transmission 3 may be any gear assembly suitable for converting rotational motion to oppositely reciprocating linear motion. One preferred embodiment of a suitable transmission is described below, but other useful embodiments will be apparent to one skilled in the art; such other embodiments are considered within the scope of the invention. Power to the tool may be supplied by a battery pack (not shown), or by an AC power connection to the motor and switch. When the tool is powered by AC electricity, the AC would typically be converted to DC by means of a bridge rectifier 18.

In the preferred embodiment shown in FIGS. 1–4, within the housing 1, the motor 2 is attached and interconnected to the transmission 3, by means of a steel bracket 19. The transmission consists of the worm gear 17, and the cam gear 20. The worm gear 17 is attached to the front end 23 of the driveshaft 11 by conventional means, and rotates by the torque of the motor. The worm gear 17 meshes with the cam gear 20 (shown in FIG. 3, for example, as a single gear with two cams 21) which converts the rotational torque to linear motion, and which transmits the linear reciprocal forces to the blade assembly 4, as described below. A practitioner skilled in the relevant art will realize that many different types of gears and configurations of gear assemblies are suitable for use in this invention, and all are considered within the scope of the invention.

Figure 3:
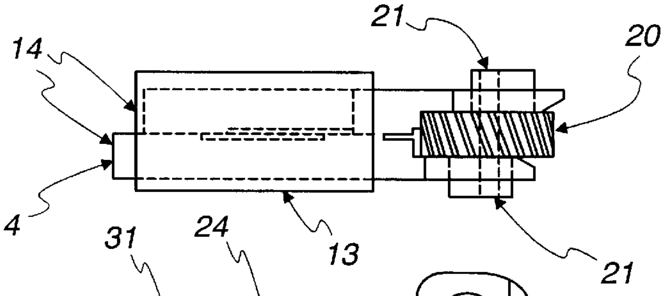
FIG. 3 is a top view of the blade holders and cam gear.
Figure 4:
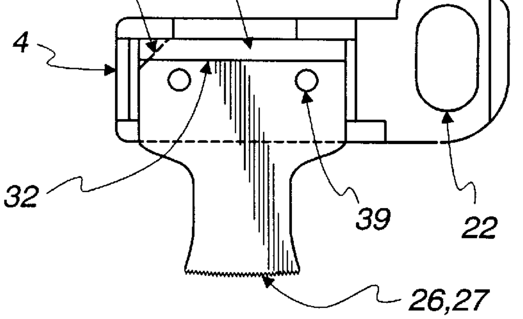
FIG. 4 is a side view of a blade holder and blade.

As shown in FIGS. 3 and 4, the blade assembly 4 is used for holding the two blades 26 and 27 within the tool, and includes a blade holder guide 13, two blade holders 14 and two blades 26 and 27. The blade holders 14 each have a pocket 32 into which the blade is inserted, and an oblong hole 22 which fits over one of the cams 21 of the cam gear. Rotation of the cam gear 20 causes the blade holders 14 and blades 26 and 27 to move in a linear motion. The cams 21, being offset 180 degrees from one another, cause the blade holders to move in oppositely reciprocating directions. The blade holder guide 13 confines the blade holders 14 into close sliding juxtaposition so they slide linearly past each other in a precise path.

Figure 2:
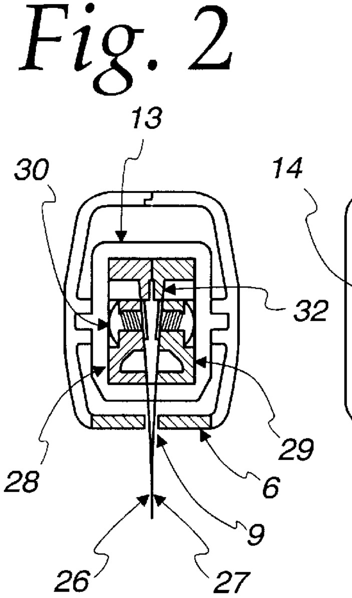
FIG. 2 is a cross-sectional drawing through the blade assembly area.

As depicted in FIGS. 2–4, each blade 26 or 27 includes a mounting end 24 and a tooth end 25. The mounting end 24 of each of the blades 26 and 27 are angularly fastened to the blade holders 28 and 29 with screws 30. The blade holders 28 and 29 are then inserted into the blade holder guide 13, which brings the blade holders 28 and 29 into close juxtaposition as shown in FIG. 2. Also as shown in FIG. 2, the angle at which blades 26 and 27 are attached to the blade holders 28 and 29 causes the blades to contact and press together in the toothed area and along their bottom half, thus causing the two blades 26 and 27 to make a single cut. The blade angle configuration of the invention minimizes the possibility of particles of wood or other material becoming trapped between the blades.

In the preferred embodiment illustrated in FIGS. 1–4, two identical blades 26 and 27 are installed into the blade holders 28 and 29, and each blade has, on its mounting end 24, one 45-degree chamfered corner 31. The pocket 32 in each blade holder has an equivalent 45-degree chamfered corner, such that the blade can only be installed in the correct direction. The need for this will become obvious in the next paragraphs. Each blade has, on its mounting end 24, typically two holes 39 for the purpose of securely mounting the blades to the blade holders by means of screws or other appropriate fasteners. A practitioner skilled in the art will recognize many ways to securely fasten the blades to the blade holders, including but not limited to the use of screws, bolts, nuts, t-nuts or snap-in means with or without the use of specific fasteners or holes in the blades, and all are considered within the scope of the invention.

The blade teeth 25 are configured in a way that facilitates cutting deep into the wood or other material without binding, and which configuration clears particulate matter such as dust away from the teeth while resisting the tendency of the particulate matter such as dust to become trapped between the blades, and which configuration avoids the tendency for the blades to catch and jump away from the precise location of the intended cut.

Figure 5:
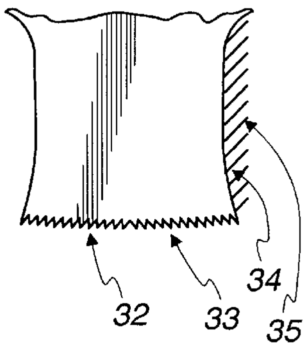
FIG. 5 is an enlarged view of the lower half of the blade.

As shown in FIG. 5, on each of blades 26 and 27, half of the teeth point forward 32 and the other half of the teeth point aft 33. This tooth configuration tends to push the dust to both ends of the blade, and the blades 26 and 27 can continue penetrating without being restricted by compacted dust. When the dust reaches the ends of the blades 26 and 27, it will compact against the ends of the slot, which, if using conventional blades, would cause restriction of the oscillating motion of the blade. Using the novel blades of the invention, however, a space or cavity is provided for the dust to collect without impeding the blade's motion. This space or cavity is called a gullet, 34. As the end teeth of the blades pass by the compacted dust, the dust expands loosely into the gullet area 35 so that restriction of the blades is minimized. A practitioner skilled in the relevant art will realize that different shapes of gullets are suitable for use in this invention, and all are considered within the scope of the invention.

Figure 6:
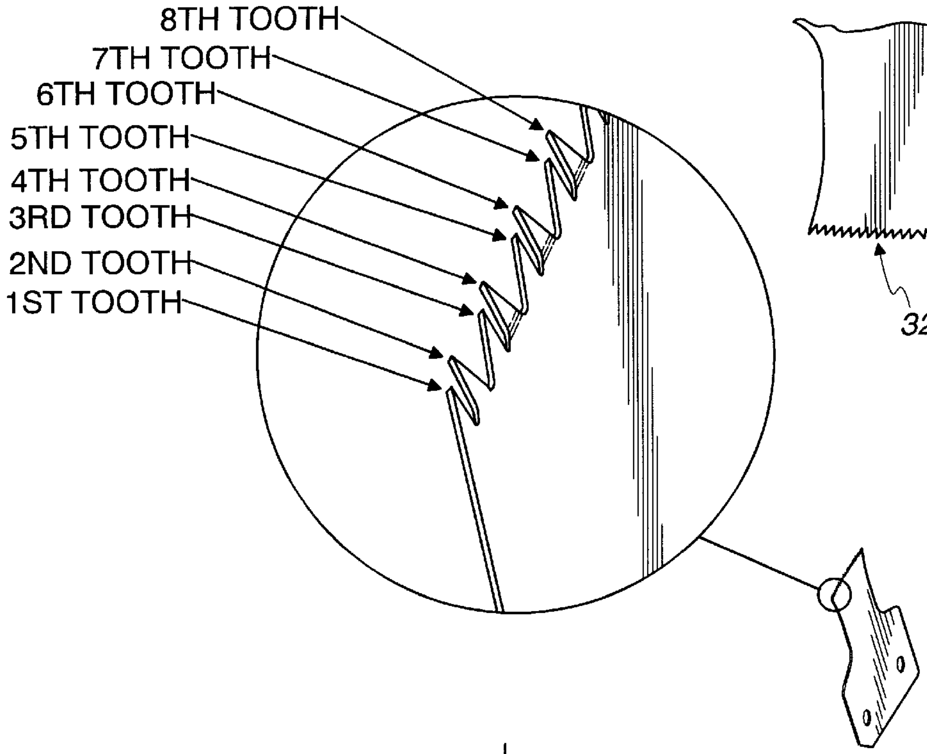
FIG. 6 is an enlarged view of the blade teeth.

Typical saw teeth are bent outward ("set") in both directions to facilitate cutting deep into material without excessive friction. The teeth of the blades in this tool must be configured in such a way to permit the two blades to oppositely reciprocate while pressed together without the teeth of one blade catching on the teeth of the other blade. To facilitate this, starting from one end of the blade, alternating teeth are straight and not bent away from the plane of the rest of the blade. Oppositely alternating teeth are bent, or set, to one side only, as illustrated in FIG. 6. The two blades are placed in juxtaposition in such a way that the teeth with set are pointing outward, away from each other. The correct blade orientation is assured by the presence of the 45-degree chamfered corner 31 in the blade, and the corresponding 45-degree chamfered corner in the pocket 32, of the blade holder 14 into which the blade 26 or 27 is inserted, which allows only one orientation of each blade 26 and 27 in the blade holder 14. The teeth that are bent, or set, cut the slot wider than the thickness of the blade sheet metal, thus allowing the blade to cut deep into the wood or other material without excessive friction on the surface of the blade. The teeth that are straight cut and clear the dust from the occlusion of the blades, and prevent uncut material such as wood from wedging the blades apart.

The amount of tooth set and the thickness of the blades determine the width or thickness of the resulting slot. In the preferred embodiment, blades of various thicknesses and various tooth sets will be made available to satisfy the need for making slots of different widths. A practitioner skilled in the relevant art will realize that many different blade thicknesses and tooth sets are suitable for use in this invention, and all are considered within the scope of the invention.

Figure 7:
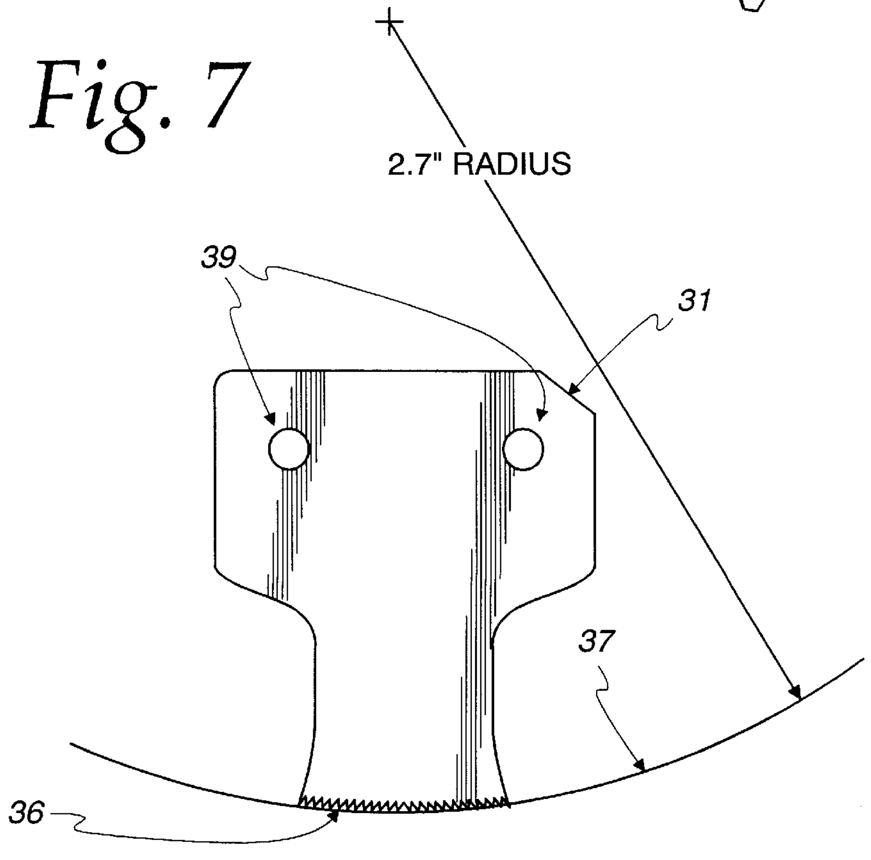
FIG. 7 is a drawing of the blade, showing the optional arc that the blade teeth nay follow.

As shown in the embodiment illustrated in FIG. 7, the blade teeth 36 follow an arc, illustrated in the embodiment shown in FIG. 7 as a 2.7 inch radius arc 37. This novel feature allows the user to be somewhat inaccurate in the alignment of the blades as the cutting action is begun, without experiencing adverse results. If blades are employed that have all the teeth in a straight line and the user does not position the tool against the material to be cut in such a way that all the teeth are contacting the material, the result is that the ends of the blades that contact the material will tend to catch on the material and jump or walk out of the desired position. Using blades with teeth that follow an arc as described above will cause the middle teeth of the blade to cut into the material first, despite any slight misalignment, thus avoiding any tendency to jump or walk out of position. A practitioner skilled in the relevant art will realize that different blade tooth radii other than 2.7 inches are suitable for use in this invention, and all are considered within the scope of the invention.

In using the tool of the invention, the operator grasps the tool in one hand, aligns the blades in juxtaposition with the intended location of the desired slot to be cut, switches on the power switch, and plunges the blades into the model material. As described above, the motor drives the worm gear which engages the cam gear. The cams of the cam gear engage the blade holders, causing the blade holders and blades to move linearly in an oppositely reciprocating manner with a sliding motion. As slight pressure is applied by the operator in the direction of the plunge cut, the blade teeth cut the fibers of the material such as wood, pushing the dust out of the way as the blades progress deeper into the material. The depth of the cut depends upon how deep the operator pushes the blades into the material, up to the total depth allowable by the physical dimensions of that portion of the blades protruding from the housing. The resulting slot or pocket is of variable depth depending upon operation, with a width and length slightly larger than that of the blades and with closed ends and a continuous perimeter. In general, the slots desired by modelers are less than 1 inch in length, although longer cuts may be desirable mind may be achieved with the present invention simply by making additional adjacent cuts. It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be within the scope of the claims.

What is claimed is:

1. A tool for plunge cutting slots in material comprising:

a housing having a first end to be grasped by a hand and a second end having a blade assembly wherein a first portion of the blade assembly positioned within the housing and a second portion extending from the second end wherein the blade assembly includes two blade holders having an angular mounting portion;

a motor positioned in the housing;

two blades wherein each blade is mounted to the angular mounting portion of the blade holders so that the blades are arranged adjacent and angularly situated to each other and to contact and press the blades together close to a cutting end of the blades to form a closed end at a cutting end of the blades during operation of the tool, wherein the blades extend partially outside the housing; and a transmission connected to the motor and the blade assembly oppositely and reciprocatingly driving the blades, wherein a cut with closed ends and a continuous perimeter is formed by placing blades directly over the area in which the cut is desired and actuating the motor, then pushing the blades into a material to make a single cut by the cutting end of the blades.

2. The tool of claim 1 wherein the transmission is a dual gear mechanism that is operably attached to the blade assembly.

3. The tool of claim 2 wherein the dual gear mechanism comprises one worm gear and one cam gear, the cam gear being comprised of a single gear with two cams, one on each side of the gear.

4. The tool of claim 1 wherein the blade assembly includes one blade holder guide attached to the housing, and wherein each blade has a plurality of teeth and is attached to the blade holder and both blade holders are held in close sliding juxtaposition by the blade holder guide.

5. The tool of claim 1 wherein the housing further includes a fan.

6. The tool of claim 1 wherein the tool is used for plunge cutting into balsa wood.

7. The tool of claim 4 wherein one-half of the teeth point forward and the other half of the teeth point aft.

8. The tool of claim 4 wherein the blade teeth follow an arc.

9. The tool of claim 7 wherein the front and aft edges of the blade are shaped to form a gullet.

10. A tool for plunge cutting material comprising:

a housing;

a motor located within the housing;

a transmission located within the housing and connected to a driveshaft, wherein the transmission includes a worm gear and a cam gear, and further wherein the worm gear is pitched to match the cam gear such that the two gears are in meshing engagement with each other; and a blade assembly at least partially located within the housing and including two blade holders wherein the blade holders situated within a blade holder guide and having an angular mounting portion, wherein the blade holders and blade holder guide are located within the housing, a blade removably attached to the angular mounting portion of each blade holder, the blades having a plurality of teeth at one end thereof and wherein each blade is arrayed adjacent and angled with respect to another blade so that the blades contact and press to form a closed end with the plurality of teeth during operation of the tool and, and wherein the blades extend outside the housing;

wherein activation of the motor causes an oppositely reciprocating and simultaneous sliding movement of the blades wherein the blades may be used to plunge a single cut by the cutting ends of the blades into balsa wood resulting in a slot or pocket with closed ends and a continuous perimeter.

11. The tool of claim 10 wherein the blades have opposite first and second sides, wherein the first side is flat, allowing it to slide unobstructed against the first side of the other blade; and wherein alternating odd teeth are straight and wherein alternating even teeth are bent outward from the blade and further wherein the first and last teeth are straight.

12. The tool of claim 10 wherein half of the teeth point forward and the other half of the teeth point aft.

13. The tool of claim 10 wherein the blade teeth follow an arc.

14. The tool of claim 10 wherein the front and aft edges of the blade are shaped to form a gullet.

15. A tool for plunge cutting comprising:

a substantially L-shaped housing adapted for one handed operation, having a first end to be grasped by a hand and a second end;

a motor supported within the housing;

a blade assembly supported within the second end of the housing and sized to accept two blades each containing a plurality of teeth and in adjacent operation to each other, wherein each blade is attached to an angular mounting portion of a blade holder which is mounted within a blade holder guide; and wherein the blade holders are oppositely attached to form the blade assembly wherein the blades have opposite first and second ends, wherein the first end is mounted to the angular mounting portion so that the blades contact and press to form a closed end at the second ends of the blades during operation of the tool;

a transmission drivingly connected to the motor for reciprocating the blades in a simultaneous linearly opposite sliding manner parallel with the longitudinal axis of the second end of the housing, wherein the moving blades may be used to make a cut into balsa wood by the closed end of the blades to form a single cut with closed ends and a continuous perimeter in material by contacting the blades with the area in which the cut is desired and actuating the motor, then pushing the blades into the material to form the cut;

a fan attached to the driveshaft of the motor on the end of the motor opposite the transmission, wherein the fan draws air in through louvers in the housing and forces the air in through and around the motor to cool the motor; and wherein the air passes out of the housing through the blade opening.

16. A tool for plunge cutting comprising:

a motor;

a transmission connected to the motor; and a blade assembly connected to the drive means; wherein the blade assembly includes two blade holders having an angular mounting portion and blades removably mounted to the angular mounting portion so that the blades contact and press to form a closed end with a plurality of blade teeth during operation of the tool that make a single cut wherein the blade assembly moves the blades in a simultaneous, linear and oppositely reciprocating sliding manner, and further wherein the tool is used for making plunge cuts which have closed ends and a continuous perimeter into balsa wood.

17. The tool of claim 16 wherein one-half of the teeth point forward and the other half of the teeth point aft.

18. The tool of claim 16 wherein the blade teeth follow an arc.

19. The tool of claim 16 wherein the front and aft edges of the blade are shaped to form a gullet.

* * * * *